United States Patent
Yamada

(10) Patent No.: US 9,883,474 B2
(45) Date of Patent: Jan. 30, 2018

(54) RING-SHAPED SYNCHRONOUS NETWORK SYSTEM AND TIME SLAVE STATION

(71) Applicant: Mitsubishi Electric Corporation, Chiyoda-ku, Tokyo (JP)

(72) Inventor: Atsushi Yamada, Tokyo (JP)

(73) Assignee: Mitsubishi Electric Corporation, Chitoda-ku, Tokyo (JP)

( * ) Notice: Subject to any disclaimer, the term of this patent is extended or adjusted under 35 U.S.C. 154(b) by 120 days.

(21) Appl. No.: 14/891,987

(22) PCT Filed: Jul. 19, 2013

(86) PCT No.: PCT/JP2013/069684
§ 371 (c)(1),
(2) Date: Nov. 18, 2015

(87) PCT Pub. No.: WO2015/008389
PCT Pub. Date: Jan. 22, 2015

(65) Prior Publication Data
US 2016/0095078 A1  Mar. 31, 2016

(51) Int. Cl.
*H04W 56/00* (2009.01)
*H04L 12/437* (2006.01)
*H04L 12/26* (2006.01)

(52) U.S. Cl.
CPC ....... *H04W 56/0035* (2013.01); *H04L 12/437* (2013.01); *H04L 43/0852* (2013.01); *H04W 56/001* (2013.01)

(58) Field of Classification Search
CPC ......... H04L 2012/421; H04L 2007/045; H04L 43/0843; H04L 43/0852; H04L 12/422; H04W 4/06
See application file for complete search history.

(56) References Cited

U.S. PATENT DOCUMENTS 6,925,349 B2  8/2005  Albrecht et al.
6,940,831 B1 *  9/2005  Omi ................... H04W 72/1236
                                                 370/310.1
(Continued)

FOREIGN PATENT DOCUMENTS

JP  07-107105 A  4/1995
JP  08-076822 A  3/1996
(Continued)

OTHER PUBLICATIONS

International Search Report for PCT/JP2013/069684 dated Aug. 27, 2013 [PCT/ISA/210].
(Continued)

*Primary Examiner* — Jeffrey M Rutkowski
*Assistant Examiner* — Rajiv Uppal
(74) *Attorney, Agent, or Firm* — Sughrue Mion, PLLC; Richard C. Turner

(57) ABSTRACT

A time slave station includes a synchronization error detecting unit that includes: a CW synchronization error detecting counter that counts a synchronization correction cycle of a transmission path in which a frame is transmitted in a first direction; a CCW synchronization error detecting counter that counts a synchronization correction cycle of a transmission path in which a frame is transmitted in a second direction; a CW synchronization-enabled time period timer that counts a CW synchronization frame reception-enabled time period; a CCW synchronization-enabled time period timer that counts a CCW synchronization frame reception-enabled time period; a CW-based synchronization error determining unit that determines whether the CW synchronization frame is received in the CW synchronization frame reception-enabled time period; and a CCW-based synchronization error determining unit that determines whether the (Continued)

CCW synchronization frame is received during the CCW synchronization frame reception-enabled time period.

15 Claims, 11 Drawing Sheets

(56) References Cited

U.S. PATENT DOCUMENTS

| | | | |
|---|---|---|---|
| 7,539,414 B2* | 5/2009 | Zami | H04J 3/0658 370/459 |
| 9,319,239 B2* | 4/2016 | Bahren | H04L 12/422 |
| 2002/0031199 A1* | 3/2002 | Rolston | H04J 3/0685 375/356 |
| 2004/0008720 A1* | 1/2004 | Wang | H04L 12/422 370/460 |
| 2004/0081079 A1* | 4/2004 | Forest | H03M 13/43 370/216 |
| 2005/0141565 A1* | 6/2005 | Forest | H03M 13/43 370/503 |
| 2006/0171329 A1* | 8/2006 | Ying | H02J 13/0062 370/254 |
| 2006/0203851 A1* | 9/2006 | Eidson | H04J 3/0667 370/503 |
| 2006/0251046 A1* | 11/2006 | Fujiwara | H04J 3/0652 370/350 |
| 2009/0100189 A1* | 4/2009 | Bahren | H04L 12/422 709/231 |
| 2011/0267854 A1* | 11/2011 | Flannery | H02M 7/493 363/72 |
| 2013/0322462 A1* | 12/2013 | Poulsen | H04J 3/06 370/458 |
| 2014/0198784 A1* | 7/2014 | Nakajima | H04J 3/0641 370/350 |
| 2014/0321481 A1* | 10/2014 | Buhl | H04L 7/0033 370/503 |

FOREIGN PATENT DOCUMENTS

| | | |
|---|---|---|
| JP | 11-216575 A | 8/1999 |
| JP | 4123946 B2 | 8/2004 |
| JP | 2005-269879 A | 9/2005 |
| JP | 2005-341148 A | 12/2005 |
| JP | 4498250 B2 | 4/2007 |
| JP | 4645476 B2 | 9/2007 |
| JP | 4123946 B2 | 7/2008 |
| JP | 2009-130519 A | 6/2009 |
| JP | 4498250 A | 7/2010 |
| JP | 4645476 B2 | 3/2011 |
| JP | 4652661 B2 | 3/2011 |
| JP | 2011-199420 A | 10/2011 |
| JP | 2011199420 * | 10/2011 |

OTHER PUBLICATIONS

Written Opinion for PCT/JP2013/069684 dated Aug. 27, 2013 [PCT/ISA/237].

* cited by examiner

RING-SHAPED SYNCHRONOUS NETWORK SYSTEM AND TIME SLAVE STATION

CROSS REFERENCE TO RELATED APPLICATIONS

This application is a National Stage of International Application No. PCT/JP2013/069684 filed Jul. 19, 2013, the contents of all of which are incorporated herein by reference in their entirety.

FIELD

The present invention relates to a ring-shaped synchronous network system and a time slave station.

BACKGROUND

A ring-shaped synchronous network system according to the related art has a configuration in which two or more communication devices are connected in a dual ring structure and includes a time master station supplying a reference time and time slave stations operating on the basis of the reference time of the time master station. In such a ring-shaped synchronous network system, the stations are synchronized with each other as follows (for example, see Patent Literature 1): First, propagation delay times from the time master station to the time slave stations are measured in advance using a propagation delay measurement frame; and the time slave stations then correct a slave clock counter with a correction value reflecting the propagation delay when a synchronization frame is received from the time master station.

Patent Literature 1 contains a proposal for a configuration for preventing unsuitable synchronization correction when the arrival time of a synchronization frame varies due to communication disturbances or the like, when a synchronization frame arrives at the slaves with a time delay, or when a false synchronization frame due to noise or the like causes contamination. The time slave station corrects the slave clock counter when a synchronization frame is received within a synchronization frame reception-enabled time period, and it does not correct the slave clock counter otherwise. The synchronization frame reception-enabled time period is a time period with a duration calculated on the basis of the fluctuation of the synchronization timing (or synchronization jitter) present in a synchronization system or a duration calculated on the basis of the target synchronization accuracy. The period starts at a timing reflecting the synchronization frame propagation delay times between the time master station and the time slave stations in clockwise and counterclockwise paths. The synchronization frame reception-enabled time period enables synchronization using a synchronization frame (a process of correcting the slave clock counter according to a received synchronization frame) only during this period.

Since the slave clock counter is used to control the synchronization frame reception-enabled time period, a time interval (hereinafter, referred to as a synchronization correction cycle) in which a slave clock is periodically corrected using the synchronization frame and a time interval (hereinafter, referred to as a communication cycle) in which a frame from a specific station is periodically received are equal to each other (for example, see Patent Literature 2).

CITATION LIST

Patent Literature

Patent Literature 1: Japanese Patent Application Laid-Open No. 2011-199420
Patent Literature 2: Japanese Patent Application Laid-Open No. 2009-130519

SUMMARY

Technical Problem

In the ring-shaped synchronous network system according to the related art, as described above, the synchronization correction cycle and the communication cycle are equal to each other. Accordingly, in a network in which stations transmit data once every communication cycle using a token passing system or a time division multiplex communication system, even when a slave station not associated with synchronization control is provided in the network, the communication cycle duration is dragged to the synchronization correction cycle duration and is extended. As a result, there is a problem in that intervals for updating a variety of data in the network are also extended and a utilization rate of a communication line decreases.

The present invention is made in consideration of the above-mentioned circumstances, and an object thereof is to provide a ring-shaped synchronous network system and a time slave station which can enhance a utilization rate of a communication line when a time master station and time slave stations are synchronized with each other in a ring-shaped synchronous network system, as compared to the related art.

Solution to Problem

In order to achieve the objective, the present invention relates to a time slave station that is used in a ring-shaped synchronous network system to which a time master station and one or more time slave stations are connected so as to form a dual ring configuration via transmission paths and in which a synchronization correction cycle between the time master station and the time slave station is a natural number times a communication cycle with which the time master station and the time slave station periodically communicate with each other. The time slave station includes: a slave clock counter that counts the communication cycles; and a synchronization error detecting unit that detects a synchronization error between the time master station and the time slave station. The synchronization error detecting unit includes: a first synchronization error detecting counter that counts the synchronization correction cycles of the transmission path in which a frame is transmitted in a first direction; a second synchronization error detecting counter that counts the synchronization correction cycles of the transmission path in which a frame is transmitted in a second direction that is opposite to the first direction; a first synchronization-enabled time period counting unit that counts a first synchronization frame reception-enabled time period that is a reception-enabled time period of a first synchronization frame transmitted in the first direction when a count value of the first synchronization error detecting counter reaches a first set value; a second synchronization-enabled time period counting unit that counts a second synchronization frame reception-enabled time period that is a reception-enabled time period of a second synchronization frame transmitted in the second direction when a count value of the second synchronization error detecting counter reaches a second set value; a first synchronization error determining unit that determines whether the first synchronization frame is received during the first synchronization frame reception-enabled time period; and a second synchronization error determining unit that determines whether the second synchronization frame is received during the second synchronization frame reception-enabled time period.

Advantageous Effects of Invention

According to the present invention, the communication cycle duration is set to 1/N (where N is an arbitrary natural number) of the synchronization correction cycle duration. Accordingly, even when a slave station not associated with synchronization control is present in the network, it is possible to prevent the communication cycle duration from being dragged to the synchronization correction cycle duration and from being extended, to shorten an interval for updating data in the network, and to enhance a utilization rate of a communication line.

DESCRIPTION OF EMBODIMENTS

Hereinafter, preferred exemplary embodiments of a ring-shaped synchronous network system and a time slave station according to the present invention will be described in detail with reference to the accompanying drawings. The present invention is not limited to the embodiments. A synchronization method in a general ring-shaped synchronous network system and problems thereof will be first described and then the embodiments will be described.

Figure 1:
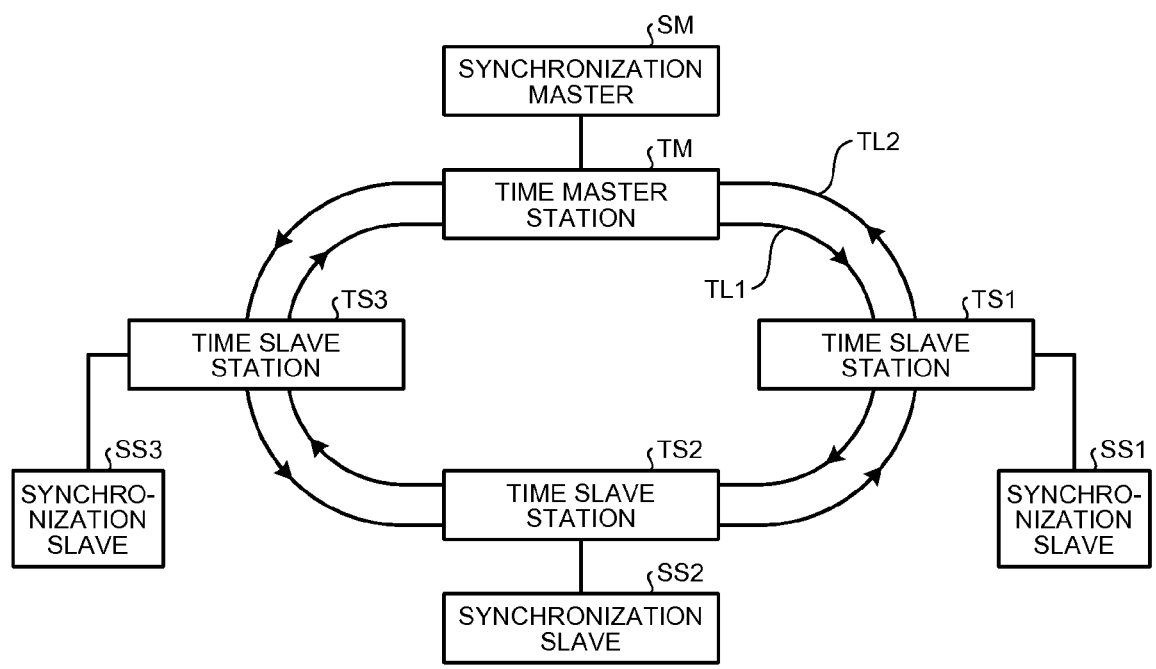
FIG. 1 is a diagram schematically illustrating an example of a configuration of a ring-shaped synchronous network system.

FIG. 1 is a diagram schematically illustrating an example of a configuration of a ring-shaped synchronous network system. As illustrated in the drawing, in the ring-shaped synchronous network system, two or more communication devices are connected via transmission paths (networks) to constitute a dual ring. Here, one transmission path constituting the dual ring is a CW-based communication path TL1 in which a frame is transmitted in the clockwise direction and the other transmission path is a CCW-based communication path TL2 in which a frame is transmitted in the counterclockwise direction.

Among the communication devices, one is a time master station TM, and the other communication devices are time slave stations TS1 to TS3. The time master station TM is connected to the synchronization master SM of the whole ring-shaped synchronous network system. The synchronization master SM is an external device and the synchronization timing is transmitted from the synchronization master SM to the time master station TM. The time master station TM transmits the synchronization timing transmitted from the synchronization master SM to the time slave stations TS1 to TS3 via the network. The time slave stations TS1 to TS3 are connected to synchronization slaves SS1 to SS3, which are external devices, and transmit the synchronization timing transmitted from the time master station TM to the synchronization slaves SS1 to SS3. In FIG. 1, four communication devices (one time master station TM and three time slave stations TS1 to TS3) are connected to each other in a ring shape, but the number of communication devices connected is not limited to four.

Figure 2:
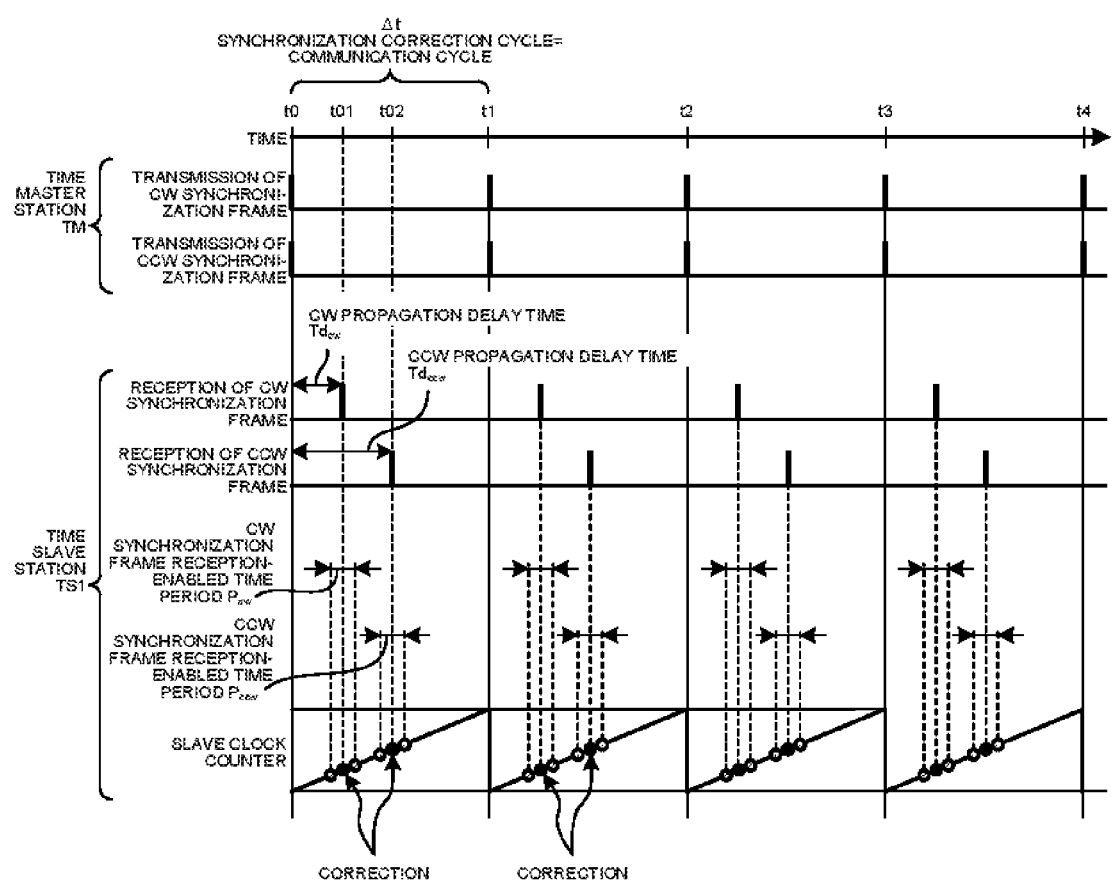
FIG. 2 is a diagram illustrating a slave clock counter correcting process in a general ring-shaped synchronous network system.

FIG. 2 is a diagram illustrating a slave clock counter correcting process in a general ring-shaped synchronous network system. In the drawing, the horizontal axis represents time. Here, the transmission state of a synchronization frame in the time master station TM, the reception state of a synchronization frame in the time slave station TS1, the synchronization frame reception-enabled time period, and the state of the slave clock counter are illustrated. In the ring-shaped synchronous network system, the synchronization correction cycle and the communication cycle are equal to each other.

The time master station TM simultaneously transmits a synchronization frame in a CW direction and a CCW direction with a cycle of $\Delta t$ (where $\Delta t$ is a communication cycle) at time t0. A CW synchronization frame reaches the time slave station TS1 after a CW propagation delay time $Td_{CW}$ elapses, and a CCW synchronization frame reaches the time slave station TS1 after a CCW propagation delay time $Td_{CCW}$ elapses. Synchronization frame reception-enabled time periods $P_{CW}$ and $P_{CCW}$, in which the reception of a synchronization frame in the corresponding period is enabled, are set for the CW-based communication path and the CCW-based communication path, respectively. In this example, the CW synchronization frame and the CCW synchronization frame are received during the synchronization frame reception-enabled time periods $P_{CW}$ and $P_{CCW}$, respectively.

At time $t0+Td_{CW}$ (=t01), the slave clock counter performs a predetermined count until the time slave station TS1 receives the CW synchronization frame, but the count includes an error from the oscillation element used in the slave clock or the like. Accordingly, at time t01, at which the CW synchronization frame is received, a process of correcting the slave clock counter to a predetermined value is performed. This operation is the same as that of the CCW-based communication path. At time t0+$Td_{CCW}$ (=t02), at which the CCW synchronization frame is received, the process of correcting the slave clock counter to a predetermined value is performed. These processes are performed every synchronization correction cycle (communication cycle).

In a general ring-shaped synchronous network system, the synchronization correction cycle and the communication cycle are in the equal relation with each other. In a network in which stations in the network transmit data once per communication cycle using a token passing system or a time division multiplex communication system, even when a slave station not associated with synchronization control is present in the network, the communication cycle duration is dragged and extended to the synchronization correction cycle duration and intervals at which a variety of data is updated in the network is extended. As a result, the utilization rate of a communication line is lowered.

As a method of improving the utilization rate of a communication line, a method is possible that performs slave clock counter correction (hereinafter, referred to as discrete-cycle synchronization correction) using a synchronization frame only once per plural communication cycles by counting the number of communication cycles repeated (hereinafter, referred to as the number of communication cycles).

Figure 3:
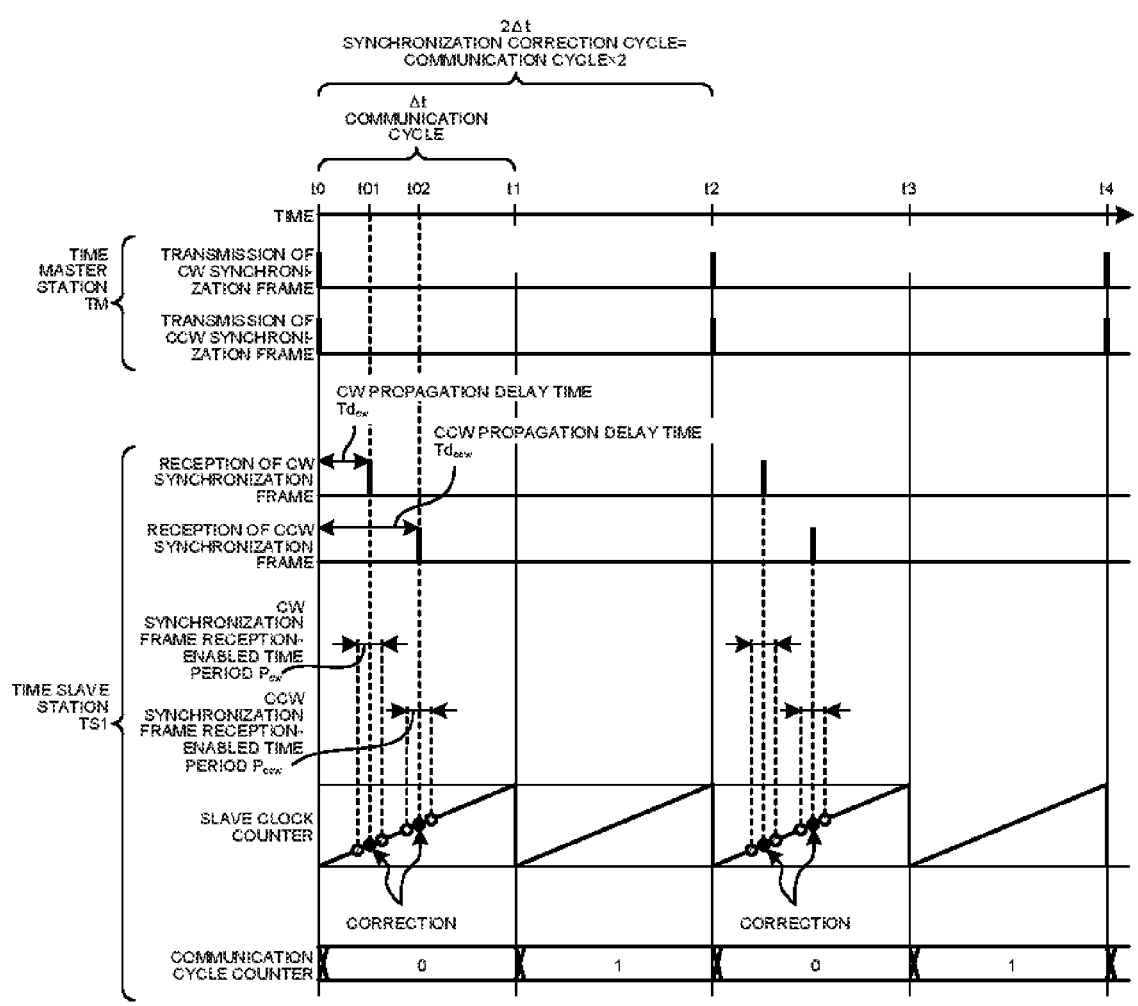
FIG. 3 is a diagram illustrating a concept of a discrete-cycle synchronization correction process of a slave clock counter in a ring-shaped synchronous network system.

FIG. 3 is a diagram illustrating a concept of a discrete-cycle synchronization correction process of a slave clock counter in a ring-shaped synchronous network system. In the drawing, the horizontal axis represents time. Here, a transmission state of a synchronization frame in the time master station TM, a reception state of a synchronization frame in the time slave station TS1, a synchronization frame reception-enabled time period, a state of the slave clock counter, and a state of the communication cycle counter are illustrated. In the ring-shaped synchronous network system, it is assumed that the synchronization correction cycle is two times the communication cycle.

The time master station TM simultaneously transmits a CW synchronization frame and a CCW synchronization frame with a cycle of 2Δt (where Δt is a communication cycle) at time t0. The CW synchronization frame reaches the time slave station TS1 at time t01 after a CW propagation delay time $Td_{CW}$ elapses, and the CCW synchronization frame reaches the time slave station TS1 at time t02 after a CCW propagation delay time $Td_{CCW}$ elapses. Synchronization frame reception-enabled time periods $P_{CW}$ and $P_{CCW}$ are set for the CW-based communication path and the CCW-based communication path, respectively. In this example, it is assumed that the CW synchronization frame and the CCW synchronization frame are received during the synchronization frame reception-enabled time periods $P_{CW}$ and $P_{CCW}$, respectively.

At time t01, the slave clock counter counts a predetermined number until the time slave station TS1 receives the synchronization frame along the CW-based communication path. However, the count value includes an error. Accordingly, at time t01 at which the CW synchronization frame is received, a process of correcting the slave clock counter to a predetermined value is performed. This happens in a similar way in the CCW-based communication path. At time t02 at which the CCW synchronization frame is received, the process of correcting the slave clock counter to a predetermined value is performed. These processes are performed every synchronization correction cycle 2Δt.

In FIG. 3, the time slave station TS1 counts the number of communication cycles using a communication cycle counter and performs discrete-cycle synchronization correction using a synchronization frame only once every plural (two in this case) communication cycles. When the discrete-cycle synchronization correction of the slave clock is performed with high accuracy and the synchronization frame reception-enabled time period is not greater than the communication cycle, the discrete-cycle synchronization correction can be performed by counting the number of communication cycles and setting the synchronization frame reception-enabled time period to a cycle corresponding to an arbitrary count value.

In synchronizing the timing, it is necessary to take into consideration the following factors of synchronization timing fluctuation (hereinafter, referred to as synchronization jitter) (A) to (C).

(A) Fluctuation due to a difference in clock counter operating speed due to a frequency deviation between oscillation elements which are used in the synchronization master SM (external device), the time master station TM, and the time slave stations TS1 to TS3.

(B) Fluctuation of a synchronization signal input timing which occurs when a synchronization signal propagates in an external path from the synchronization master SM to the time master station TM.

(C) Fluctuation of a frame arrival timing which occurs when a synchronization frame and a propagation delay measurement frame propagate in a network path from the time master station TM to the time slave stations TS1 to TS3.

Figure 4:
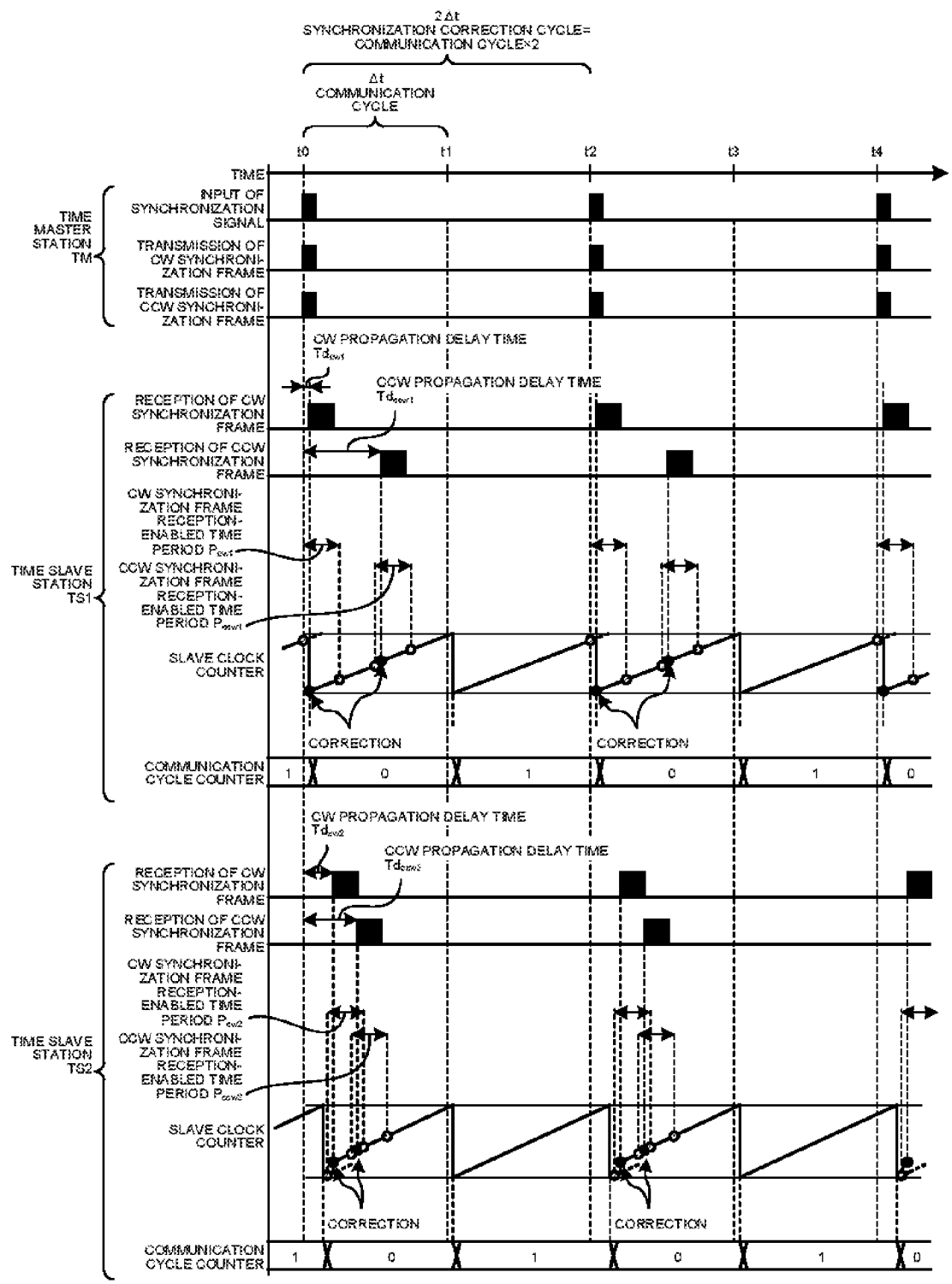
FIG. 4 is a diagram illustrating a concept of a discrete-cycle synchronization correcting process of a slave clock counter in consideration of factors of synchronization jitter.

In consideration of these factors of synchronization jitter, a time slave station TS, in which the synchronization frame reception-enabled time period has to be set to cover the communication cycle, may be present. FIG. 4 is a diagram illustrating a concept of a discrete-cycle synchronization correcting process of the slave clock counter in consideration of the factors of synchronization jitter. In the drawing, the horizontal axis represents time. In the time master station TM, an input state of a synchronization signal and a transmission state of a synchronization frame are illustrated. In two time slave stations TS1 and TS2, a reception state of a synchronization frame, a synchronization frame reception-enabled time period, a state of the slave clock counter, and a state of the communication cycle counter are illustrated. In the ring-shaped synchronous network system, it is assumed that the synchronization correction cycle is two times the communication cycle.

For example, in the time slave station TS1 in FIG. 4, the synchronization frame reception-enabled time period $P_{CW1}$ of the CW synchronization frame is set to the first to zeroth cycles of the communication cycle counter in consideration of the synchronization jitter, and the synchronization frame reception-enabled time period $P_{CCW1}$ of the CCW synchronization frame is set to the zeroth cycle of the communication cycle counter. On the other hand, in the time slave station TS2, both the synchronization frame reception-enabled time periods $P_{CW2}$ and $P_{CCW2}$ of the CW synchronization frame and the CCW synchronization frame are set to the zeroth cycle of the communication cycle counter.

In this way, in a system in which the time slave station TS, in which the synchronization frame reception-enabled time period cover more than the communication cycle, is present, a time slave station TS, in which the synchronization frame reception-enabled time period is set to the zeroth cycle and the first cycle of the communication cycle, is present. In this case, the time slave stations TS need to recognize the magnitude difference between the synchronization jitter and the propagation delay time during the synchronization frame reception-enabled time periods in the CW-based communication path and the CCW-based communication path, and need to determine to which of the zeroth cycle and the first cycle the stations themselves should set the start time of the synchronization frame reception-enabled time period. As a result, the synchronization system, when being designed, becomes complicated. When the synchronization frame reception-enabled time period is controlled using the slave clock counter, the start time and the end time of the synchronization frame reception-enabled time period in the CW-based communication path and the CCW-based communication path are different from each other, and thus the start time of the synchronization frame reception-enabled time period and the end time of the synchronization frame reception-enabled time period should be set for each of the CW-based communication path and the CCW-based communication path.

The following two types of errors are considerable as the synchronization error in a general ring-shaped synchronous network system.

(a) Desynchronize Error

When a synchronization frame is received outside the synchronization frame reception-enabled time period, the time master station TM and the time slave station TS are not synchronized with each other.

(b) Non-Reception Error

When a synchronization frame is not received during the synchronization frame reception-enabled time period, the slave clock counter of the time slave station TS is not temporarily corrected but freely runs. When the delay times of the master clock counter and the slave clock counter which are caused due to a clock difference between the time master station TM and the time slave station TS with the lapse of time reach an allowable limit time (hereinafter, referred to as a free-running limit time) of the synchronization system, the time master station TM and the time slave station TS are not synchronized with each other.

In the above-mentioned typical synchronization correction method, the concept of the synchronization frame reception-enabled time period is used to prevent the synchronization correction at irregular timings, but it has not been proposed in the related art such techniques that the synchronization errors as mentioned in (a) and (b) are detected and a notification of an error is transmitted to an application of the synchronization system. That is, a synchronization error detecting function is not complete in the related art.

Accordingly, in the following embodiment, a ring-shaped synchronous network system and a time slave station which can prevent a decrease in the utilization rate of a communication line due to non-coping with the discrete-cycle synchronization correction and can avoid complication in design of the synchronization system due to coping with the discrete-cycle synchronization correction will be described. A ring-shaped synchronous network system and a time slave station which can detect a synchronization error will also be described.

Embodiment

Figure 5:
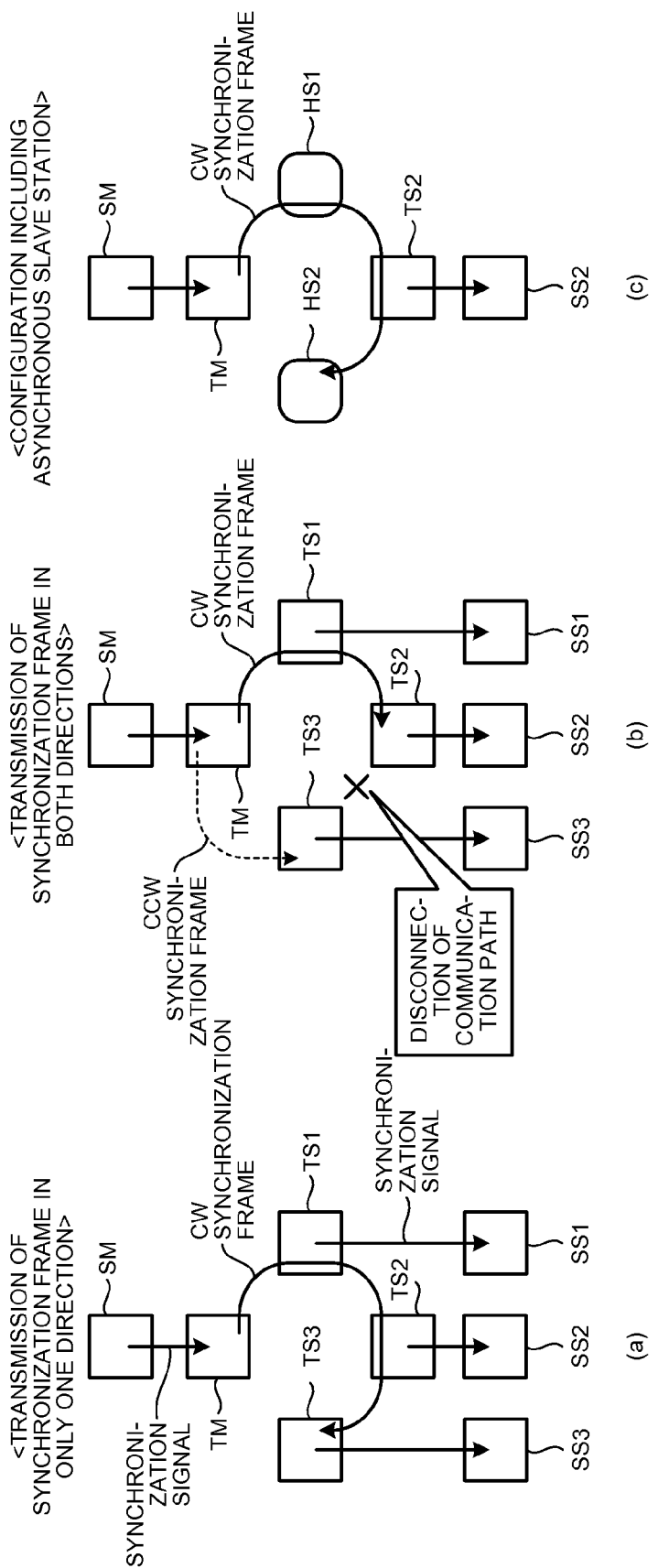
FIG. 5 is a diagram illustrating an example of a configuration of an exclusive reception type ring-shaped synchronous network system.
Figure 6:
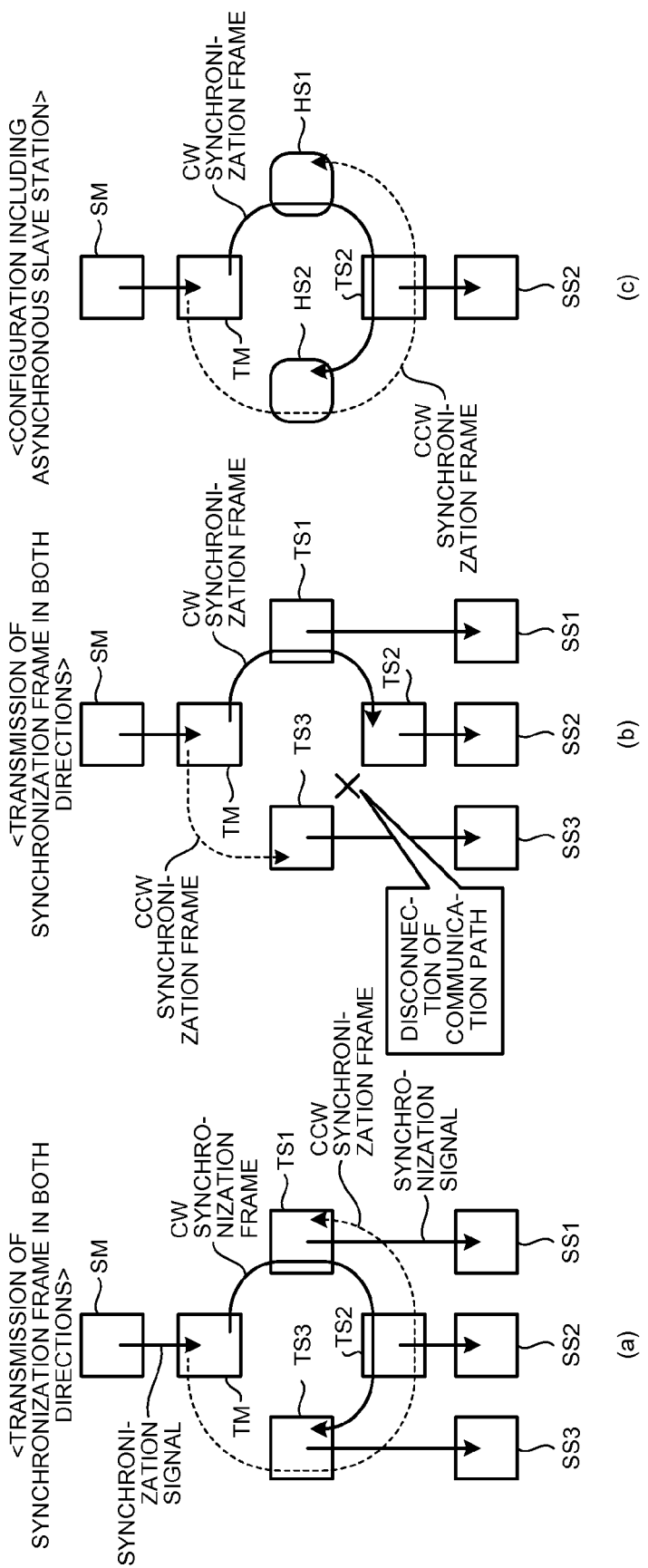
FIG. 6 is a diagram illustrating an example of a configuration of a simultaneous reception type ring-shaped synchronous network system.

This embodiment can be applied to both an exclusive type ring-shaped synchronous network system that exclusively receives CW-based and CCW-based synchronization frames and a simultaneous type ring-shaped synchronous network system that simultaneously receives CW-based and CCW-based synchronization frames. FIG. 5 is a diagram illustrating an example of the configuration of the exclusive reception type ring-shaped synchronous network system. FIG. 6 is a diagram illustrating an example of the configuration of the simultaneous reception type ring-shaped synchronous network system.

In the exclusive reception type ring-shaped synchronous network system as illustrated in FIG. 5(a), the time master station TM having received a synchronization signal from the synchronization master SM transmits a CW synchronization frame along one communication path, i.e., the CW-based communication path in this example, and transmits a synchronization signal to synchronization targets SS1 to SS3 connected to the time slave stations TS1 to TS3 in synchronization with the communication devices (the time slave stations TS1 to TS3).

As illustrated in FIG. 5(b), when a disturbance occurs in the transmission path, i.e., between the time slave station TS2 and the time slave station TS3 in this example, the CW synchronization frame and the CCW synchronization frame are transmitted along both communication paths (the CW-based communication path and the CCW-based communication path) to synchronize the communication devices with each other. When slave stations HS1 and HS2, which are not associated with the synchronization control, are present as illustrated in FIG. 5(c), a synchronization frame is transmitted along one communication path as illustrated in FIG. 5(a).

In contrast, in the simultaneous reception type ring-shaped synchronous network system, as illustrated in FIG. 6(a), the time master station TM having received a synchronization signal from the synchronization master SM transmits the CW synchronization frame and the CCW synchronization frame along both communication paths (the CW-based communication path and the CCW-based communication path) and transmits a synchronization signal to synchronization targets SS1 to SS3 connected to the time slave stations TS1 to TS3 in synchronization with the communication devices (the time slave stations TS1 to TS3).

As illustrated in FIG. 6(b), when a disturbance occurs in the transmission path, which is between the time slave station TS2 and the time slave station TS3 in this example, the synchronization frames are transmitted along both communication paths to synchronize the communication devices with each other. When slave stations HS1 and HS2, which are not associated with the synchronization control, are present as illustrated in FIG. 6(c), a synchronization frame is transmitted along both communication paths, which is similar to what is illustrated in FIG. 6(a).

Figure 7:
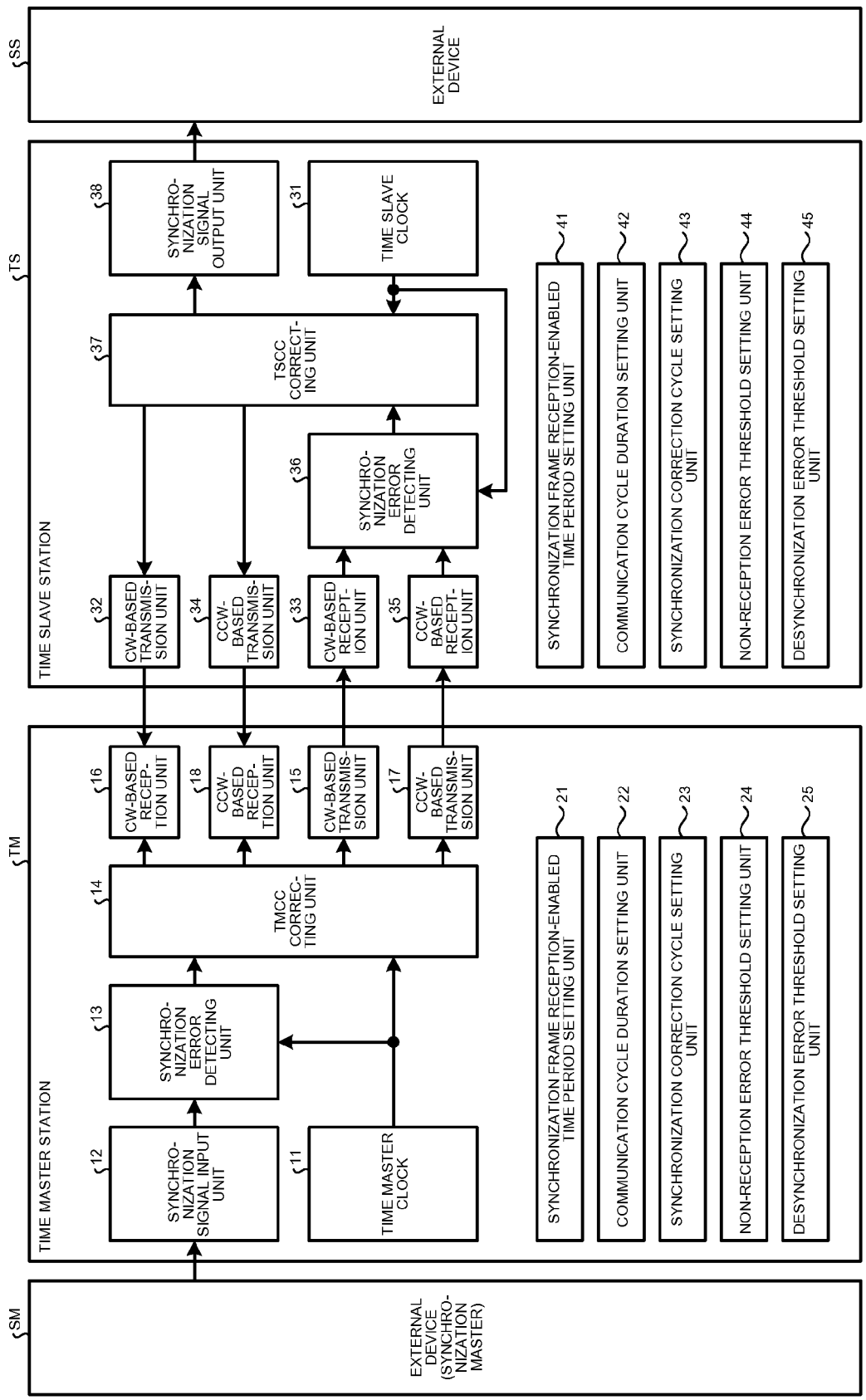
FIG. 7 is a block diagram schematically illustrating a functional configuration of a time master station and a time slave station according to an embodiment of the present invention.

FIG. 7 is a block diagram schematically illustrating a functional configuration of a time master station and a time slave station according to this embodiment. The time master station TM includes a time master clock 11 that counts time in the time master station TM; a synchronization signal input unit 12 that receives an input of a synchronization signal from a synchronization master SM, which is an external device; a synchronization error detecting unit 13 that determines whether the synchronization signal from the synchronization master SM is received during the synchronization frame reception-enabled time period, that discards the synchronization signal when the synchronization signal is not received during the synchronization frame reception-enabled time period, and that transmits the synchronization signal to a master clock counter correcting unit (denoted by TMCC CORRECTING UNIT in the drawings) 14 when the synchronization signal is received during the synchronization frame reception-enabled time period; a master clock counter correcting unit 14 that corrects a master clock counter (not illustrated) when the synchronization error detecting unit 13 determines that the synchronization signal has been received during the synchronization frame reception-enabled time period and also has been enabled; a CW-based transmission unit 15 and a CW-based reception unit 16 that perform a transmission process and a reception process for a frame on the CW-based communication path; and a CCW-based transmission unit 17 and a CCW-based reception unit 18 that perform a transmission process and a reception process for a frame on the CCW-based communication path.

The time master station TM further includes a synchronization frame reception-enabled time period setting unit 21 that sets only one set value of the synchronization frame reception-enabled time period (or target synchronization accuracy) for all the time slave stations TS in the synchronous network system; a communication cycle duration setting unit 22 that sets the communication cycle duration for the synchronous network system; a synchronization correction cycle setting unit 23 that sets the synchronization correction cycle for the synchronous network system; a non-reception error threshold setting unit 24 that sets the threshold for the non-reception error; and a desynchronization error threshold setting unit 25 that sets the threshold for the desynchronization error.

The time slave station TS includes a time slave clock 31 that counts time in the time slave station TS; a CW-based transmission unit 32 and a CW-based reception unit 33 that perform a transmission process and a reception process for a frame on the CW-based communication path; a CCW-based transmission unit 34 and a CCW-based reception unit 35 that perform a transmission process and a reception process for a frame on the CCW-based communication path; a synchronization error detecting unit 36 that determines whether a synchronization frame received by the CW-based reception unit 33 and the CCW-based reception unit 35 has been received during the synchronization frame reception-enabled time period; a slave clock counter correcting unit (denoted by TSCC CORRECTING UNIT in the drawing) 37 that corrects a slave clock counter (not illustrated) when the synchronization frame is received during the synchronization frame reception-enabled time period; and a synchronization signal output unit 38 that outputs a synchronization signal to an external device.

Figure 8:
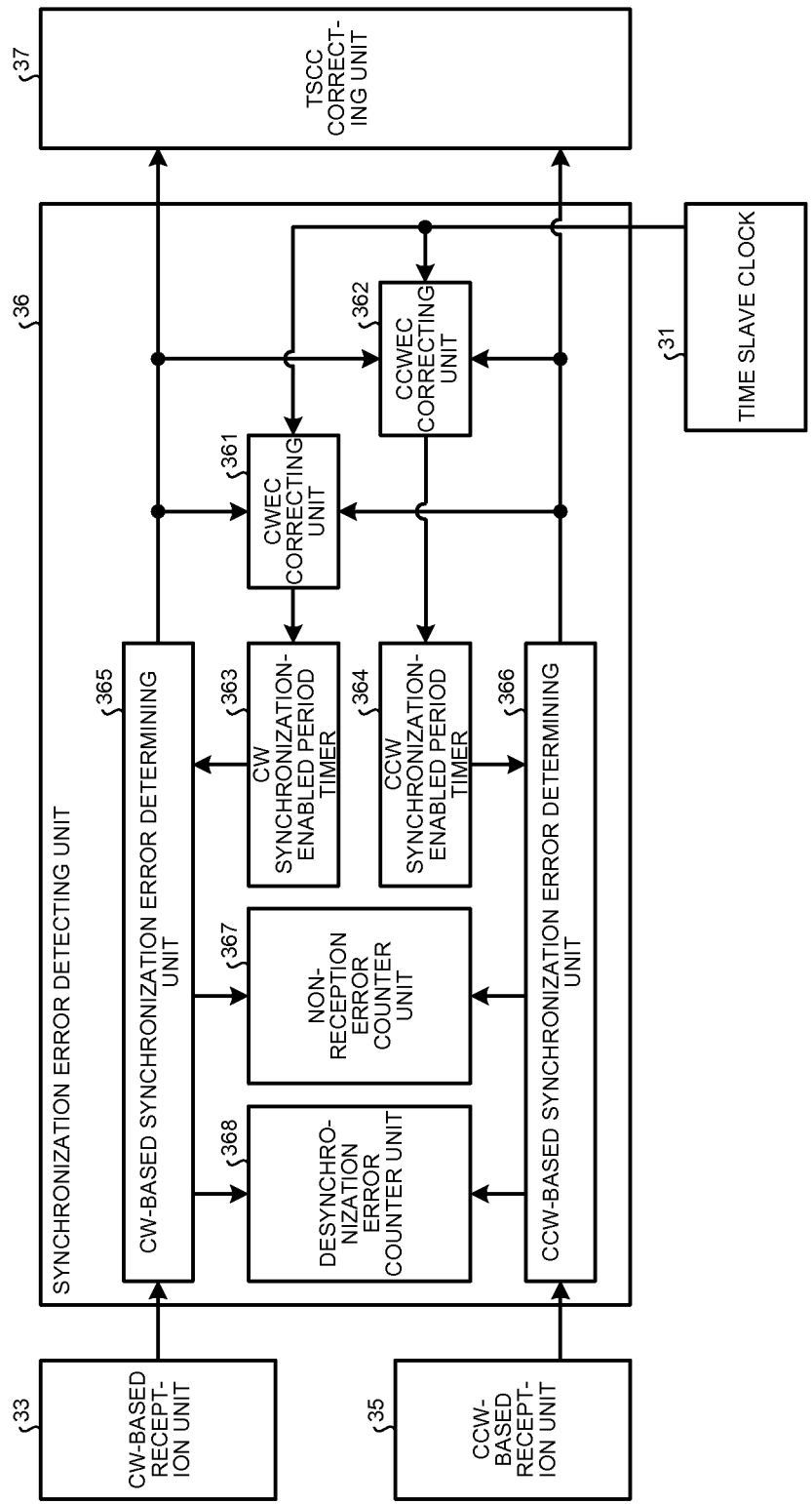
FIG. 8 is a block diagram schematically illustrating a functional configuration of a synchronization error detecting unit of a time slave station according to the embodiment.

FIG. 8 is a block diagram schematically illustrating a functional configuration of the synchronization error detecting unit of the time slave station according to this embodiment. The synchronization error detecting unit 36 includes a CW-based synchronization error detecting counter correcting unit (hereinafter, referred to as a CWEC correcting unit) 361; a CCW-based synchronization error detecting counter correcting unit (hereinafter, referred to as a CCWEC correcting unit) 362; a CW synchronization-enabled time period timer 363; a CCW synchronization-enabled time period timer 364; a CW-based synchronization error determining unit 365; a CCW-based synchronization error determining unit 366; a non-reception error counter unit 367; and a desynchronization error counter unit 368.

The CWEC correcting unit 361 includes a CW synchronization error detecting counter (hereinafter referred to as a CWEC, not illustrated) that is used to control the synchronization frame reception-enabled time period and to detect synchronization errors therein and corrects and resets the value of the counter when a predetermined condition is satisfied. The CWEC simply counts the synchronization correction cycle which is set to be equal to or greater than N times the communication cycle (where N is a natural number).

Specifically, the CWEC correcting unit 361 transmits a notification of the start of the synchronization frame reception-enabled time period to the CW synchronization-enabled time period timer 363 when the count value of the CWEC becomes equal to or greater than a predetermined start value of the synchronization frame reception-enabled time period (first set value). When the CWEC reaches a predetermined synchronization correction cycle value or when a CW-based synchronization frame is received during the CW synchronization frame reception-enabled time period, the CWEC is reset.

The CWEC correcting unit 361 sets the CWEC to a predetermined correction value (third set value) when the CCW-based synchronization frame is received during the synchronization frame reception-enabled time period of the CCW-based communication path. That is, when the CCW-based synchronization frame is received, the CWEC is corrected to a predetermined value.

In an exclusive ring-shaped synchronous network system, the synchronization frame is received along only one of the CW-based communication path and the CCW-based communication path for a long period of time. By setting the CWEC to a predetermined correction value when the synchronization frame of the CCW-based communication path is received during the CCW-based synchronization frame reception-enabled time period, the CWEC can correctly make a notification of the start time of the CW synchronization frame reception-enabled time period, even when the CW-based synchronization frame is not received for a long period time.

The CCWEC correcting unit 362 includes a CCW synchronization error detecting counter (hereinafter referred to as a CCWEC, not illustrated) that is used to control the synchronization frame reception-enabled time period and to detect synchronization errors therein and corrects and resets the value of the counter when a predetermined condition is satisfied. The CCWEC simply counts a synchronization correction cycle which is set to be equal to or greater than N times the communication cycle (where N is a natural number).

Specifically, the CCWEC correcting unit 362 transmits a notification of the start of the synchronization frame reception-enabled time period to the CCW synchronization-enabled time period timer 364 when the count value of the CCWEC becomes equal to or greater than a predetermined start value of the synchronization frame reception-enabled time period (second set value). When the CCWEC reaches a predetermined synchronization correction cycle value or when a CCW-based synchronization frame is received during the CCW synchronization frame reception-enabled time period, the CCWEC is reset.

The CCWEC correcting unit 362 sets the CCWEC to a predetermined correction value (fourth set value) when the CW-based synchronization frame is received during the synchronization frame reception-enabled time period along the CW-based communication path. That is, when the CW-based synchronization frame is received, the CCWEC is corrected to a predetermined value.

In an exclusive ring-shaped synchronous network system, the synchronization frame is received along only one of the CW-based communication path and the CCW-based communication path for a long period of time. By setting the CCWEC to a predetermined correction value when the synchronization frame of the CW-based communication path is received during the CW-based synchronization frame reception-enabled time period, the CCWEC can correctly make a notification of the start time of the CCW synchronization frame reception-enabled time period even when the CCW-based synchronization frame is not received for a long period time.

When a notification of the start of the synchronization frame reception-enabled time period is transmitted by the CWEC correcting unit 361, the CW synchronization-enabled time period timer 363 notifies the CW-based synchronization error determining unit 365, only during a predetermined timer period, that the synchronization frame reception-enabled time period is set. When a notification of the start of the synchronization frame reception-enabled time period is transmitted by the CWEC correcting unit 361 again during the notification of the synchronization frame reception-enabled time period, the CW synchronization-enabled time period timer 363 notifies the CW-based synchronization error determining unit 365, only during a predetermined timer period again at that time, that the synchronization frame reception-enabled time period is set. The reason for providing the CW synchronization-enabled time period timer 363 separately from the CWEC in order to manage the end of the CW synchronization frame reception-enabled time period will be described later.

Similarly, when a notification of the start of the synchronization frame reception-enabled time period is transmitted by the CCWEC correcting unit 362, the CCW synchronization-enabled time period timer 364 notifies the CCW-based synchronization error determining unit 366, only during a predetermined timer period, that this is the synchronization frame reception-enabled time period. When notification of the start of the synchronization frame reception-enabled time period is transmitted by the CCWEC correcting unit 362 again during the notification of the synchronization frame reception-enabled time period, the CCW synchronization-enabled time period timer 364 notifies the CCW-based synchronization error determining unit 366, only during a predetermined timer period again at that time, that this is the synchronization frame reception-enabled time period. The reason for providing the CCW synchronization-enabled time period timer 364 separately from the CCWEC in order to manage the end of the CCW synchronization frame reception-enabled time period will be described later.

As described above, by mounting the CWEC, the CW synchronization-enabled time period timer 363, the CCWEC, and the CCW synchronization-enabled time period timer 364 separately from the slave clock counter, all the time slave stations TS can set the start time of the synchronization frame reception-enabled time period and the duration of the synchronization frame reception-enabled time period to fixed values. As a result, it is possible to simplify the design of the ring-shaped synchronous network system.

When a synchronization frame is received along the CW-based communication path while the CW synchronization-enabled time period timer 363 is making a notification that this is the synchronization frame reception-enabled time period (hereinafter, referred to as the CW synchronization frame reception-enabled time period), the CW-based synchronization error determining unit 365 notifies the slave clock counter correcting unit 37, the CWEC correcting unit 361, and the CCWEC correcting unit 362 that this is when the counter should be corrected. When a CW-based synchronization frame is not received during the CW synchronization frame reception-enabled time period, the CW-based synchronization error determining unit 365 notifies the non-reception error counter unit 367 that a non-reception error of the CW-based synchronization frame occurs. When a CW-based synchronization frame is received outside the CW synchronization frame reception-enabled time period, the CW-based synchronization error determining unit 365 notifies the desynchronization error counter unit 368 that a desynchronization error of the CW-based synchronization frame occurs.

Similarly, when a synchronization frame is received along the CCW-based communication path while the CCW synchronization-enabled time period timer 364 is making a notification that this is the synchronization frame reception-enabled time period (hereinafter, referred to as the CCW synchronization frame reception-enabled time period), the CCW-based synchronization error determining unit 366 notifies the slave clock counter correcting unit 37, the CWEC correcting unit 361, and the CCWEC correcting unit 362 that this is when the counter should be corrected. When a CCW-based synchronization frame is not received during the CCW synchronization frame reception-enabled time period, the CCW-based synchronization error determining unit 366 notifies the non-reception error counter unit 367 that a non-reception error of the CCW-based synchronization frame occurs. When a CCW-based synchronization frame is received outside the CCW synchronization frame reception-enabled time period, the CCW-based synchronization error determining unit 366 notifies the desynchronization error counter unit 368 that a desynchronization error of the CCW-based synchronization frame occurs.

When a notification of the occurrence of a non-reception error is transmitted during the same synchronization correction cycle by both the CW-based synchronization error determining unit 365 and the CCW-based synchronization error determining unit 366, the non-reception error counter unit 367 causes an error counter to increment. When an error count value becomes equal to or greater than a predetermined error threshold (fifth set value), the non-reception error counter unit 367 notifies an application of the synchronous control system of the occurrence of a non-reception error of a synchronization frame. The increment timing of the error counter is set to the end timing of the synchronization frame reception-enabled time period of the path having a larger propagation delay time of a synchronization frame out of the CW synchronization frame reception-enabled time period and the CCW synchronization frame reception-enabled time period.

After a synchronization frame is not received due to the loss of a synchronization frame due to the malfunction of the time master station TM or noise or the occurrence of a disconnection of the transmission path, the non-reception error counter unit 367 can detect that the time master station TM and the time slave stations TS are not synchronized with each other due to the free-running limit time being reached and can notify an application of the synchronization system of the error.

When a notification of the occurrence of a desynchronization error is transmitted by any of the CW-based synchronization error determining unit 365 and the CCW-based synchronization error determining unit 366, the desynchronization error counter unit 368 causes an error counter to increment. When an error count value becomes equal to or greater than a predetermined error threshold (sixth set value), the desynchronization error counter unit 368 notifies an application of the synchronous control system of the occurrence of a desynchronization error. The increment timing of the error counter may be set to any timing. For example, the increment timing may be set to the switching timing of the synchronization correction cycle.

The desynchronization error counter unit 368 can detect that the time master station TM and the time slave stations TS are not synchronized with each other, and an application of the synchronization system can be notified of the error.

When a notification of the timing at which the slave clock counter should be corrected is transmitted by the CW-based synchronization error determining unit 365 or the CCW-based synchronization error determining unit 366 in the synchronization error detecting unit 36, the slave clock counter correcting unit 37 corrects the slave clock counter. For example, the slave clock counter correcting unit 37 may correct the slave clock counter in response to the synchronization frame that is received later out of the CW synchronization frame and the CCW synchronization frame. A known method can be used for a structure for correcting the slave clock counter.

The time slave station TS includes a synchronization frame reception-enabled time period setting unit 41 that sets only one single set value of the synchronization frame reception-enabled time period (or the target synchronization accuracy) for all the time slave stations TS in the synchronous network system; a communication cycle duration setting unit 42 that sets the communication cycle duration for the synchronous network system; a synchronization correction cycle setting unit 43 that sets the synchronization correction cycle for the synchronous network system; a non-reception error threshold setting unit 44 that sets a threshold for a non-reception error; and a desynchronization error threshold setting unit 45 that sets a threshold for a desynchronization error.

The synchronization frame reception-enabled time period setting units 21 and 41, the communication cycle duration setting units 22 and 42, the synchronization correction cycle setting units 23 and 43, the non-reception error threshold setting units 24 and 44, and the desynchronization error threshold setting units 25 and 45 in the time master station TM and the time slave station TS are provided. This means the values of the synchronization frame reception-enabled time period, the communication cycle duration, the synchronization correction cycle, the non-reception error threshold, and the desynchronization error threshold can be collectively set for all the stations and not individually for the stations constituting the synchronous network system. For example, the non-reception error threshold setting units 24 and 44 can set the same non-reception error threshold for all the time slave stations TS constituting the ring-shaped synchronous network system; and the desynchronization error threshold setting units 25 and 45 can set the same desynchronization error threshold for all the time slave stations TS constituting the ring-shaped synchronous network system.

The synchronization frame reception-enabled time period setting units 21 and 41, the communication cycle duration setting units 22 and 42, the synchronization correction cycle setting units 23 and 43, the non-reception error threshold setting units 24 and 44, and the desynchronization error threshold setting units 25 and 45 in the time master station TM and the time slave station TS only have to be provided in at least one station constituting the synchronous network system, and they need not be provided in all the stations. For example, the functional units above may be provided in only the time master station TM, or may be provided in only a single time slave station TS and need not be provided in the other time slave station TS and the time master station TM.

(1) A synchronization correcting process and (2) a synchronization error detecting process in the ring-shaped synchronous network system including the time slave station TS having this configuration will be described below.

(1) Synchronization Correcting Process

Figure 9:
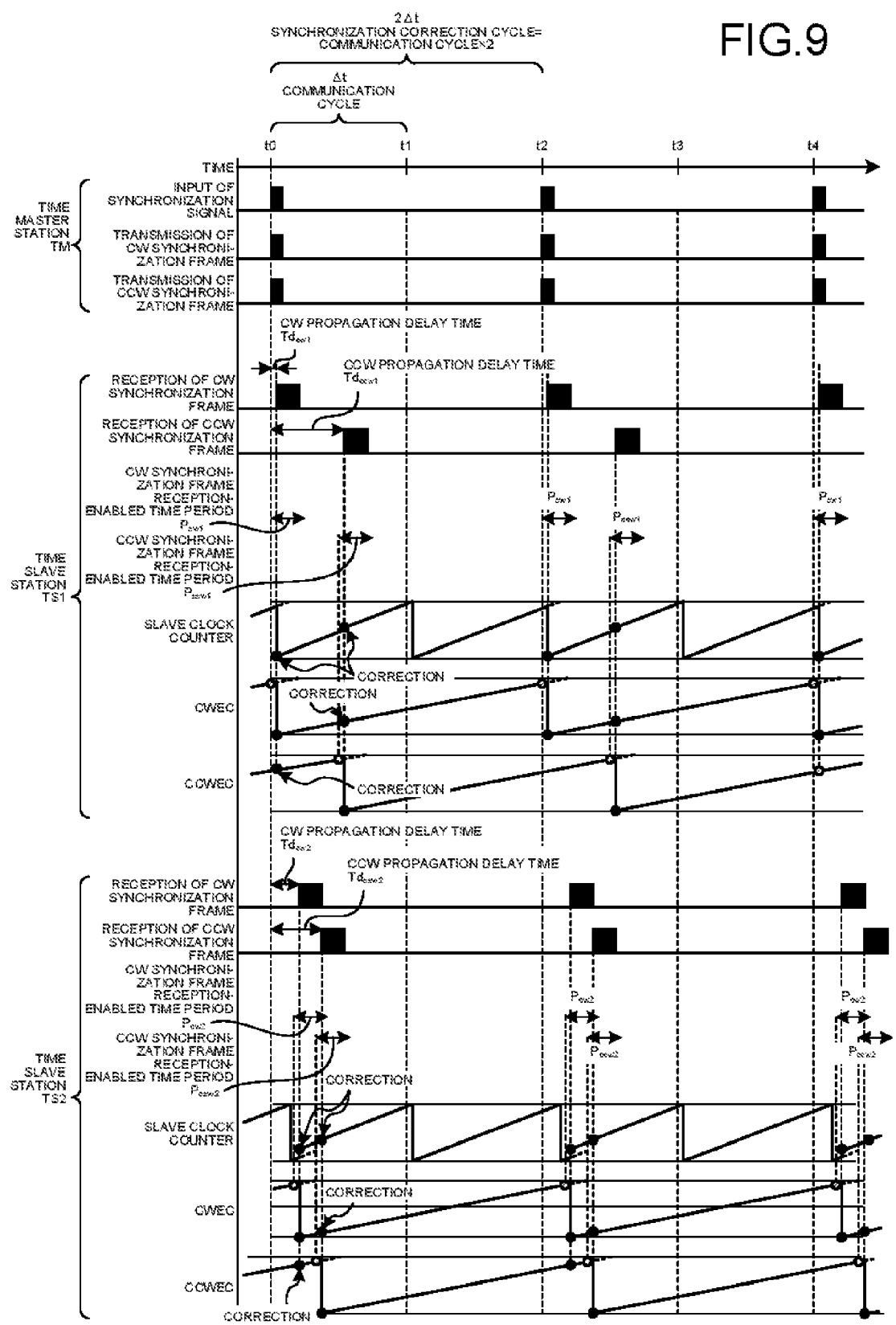
FIG. 9 is a diagram illustrating a concept of a discrete-cycle synchronization correcting process when a CWEC, a CCWEC, a CW synchronization-enabled time period timer, and a CCW synchronization-enabled time period timer are mounted independently of the slave clock counter.

FIG. 9 is a diagram illustrating a concept of a discrete-cycle synchronization correcting process when the CWEC, the CCWEC, the CW synchronization-enabled time period timer, and the CCW synchronization-enabled time period timer are mounted independently of the slave clock counter. The operations of the time master station TM and two time slave stations TS1 and TS2 are illustrated herein, the operations of which are the same for the other time slave stations TS.

In the drawing, the horizontal axis represents time. In the time master station TM, an input state of a synchronization signal and a transmission state of a synchronization frame are illustrated. In two time slave stations TS1 and TS2, a reception state of a synchronization frame, a synchronization frame reception-enabled time period, a state of the slave clock counter, and states of a CWEC and a CCWEC are illustrated. In the ring-shaped synchronous network system, it is assumed that the synchronization correction cycle is two times the communication cycle.

When a synchronization signal from the synchronization master is input at time t0, the time master station TM transmits a CW synchronization frame and a CCW synchronization frame in a broadcast manner or a multicast manner. In the time slave station TS1, when the CWEC becomes equal to or greater than the start value of the synchronization frame reception-enabled time period (first set value), the counting of the CW synchronization frame reception-enabled time period $P_{CW1}$ is performed by the CW synchronization-enabled time period timer 363.

When the time slave station TS1 receives the CW synchronization frame in the CW synchronization frame reception-enabled time period $P_{CW1}$ after the CW propagation delay time $Td_{CW1}$ elapses from time t0, the CWEC is reset, the slave clock counter is corrected to a predetermined value, and the CCWEC is corrected to a predetermined value (fourth set value).

In the time slave station TS2, when the CWEC becomes equal to or greater than the start value of the synchronization frame reception-enabled time period (first set value), the counting of the CW synchronization frame reception-enabled time period $P_{CW2}$ is performed by the CW synchronization-enabled time period timer 363. Thereafter, when the time slave station TS2 also receives the CW synchronization frame in the CW synchronization frame reception-enabled time period $P_{CW2}$ after the CW propagation delay time $Td_{CW2}$ elapses from time t0, the same process is performed as in the time slave station TS1.

In the time slave station TS2, when the CCWEC becomes equal to or greater than the start value of the synchronization frame reception-enabled time period (second set value), the counting of the CCW synchronization frame reception-enabled time period $P_{CCW2}$ is performed by the CCW synchronization-enabled time period timer 364. Thereafter, when the time slave station TS2 receives the CCW synchronization frame in the CCW synchronization frame reception-enabled time period $P_{CCW2}$ after the CCW propagation delay time $Td_{CCW2}$ elapses from time t0, the CCWEC is reset, the slave clock counter is corrected to a predetermined value, and the CWEC is corrected to a predetermined value (third set value).

In the time slave station TS1, when the CCWEC becomes equal to or greater than the start value of the synchronization frame reception-enabled time period (second set value), the counting of the CCW synchronization frame reception-enabled time period $P_{CCW1}$ is performed by the CCW synchronization-enabled time period timer 364. Thereafter, when the time slave station TS1 also receives the CCW synchronization frame in the CCW synchronization frame reception-enabled time period $P_{CCW1}$ after the CW propagation delay time $Td_{CCW1}$ elapses from time t0, the same process is performed as performed in the time slave station TS2 when the CCW synchronization frame is received.

In all the time slave stations TS1 and TS2, the start time (the first set value and the second set value) of the synchronization frame reception-enabled time period and the synchronization frame reception-enabled time period duration are set to fixed values. For example, in the example illustrated in FIG. 9, the start value of the synchronization frame reception-enabled time period for the time slave station TS1 and the start value of the synchronization frame reception-enabled time period for the time slave station TS2 are set to the same value, and the synchronization frame reception-enabled time periods $P_{CW1}$, $P_{CCW1}$, $P_{CW2}$, and $P_{CCW2}$ which are counted therefrom are set to the same value. Accordingly, it is possible to simplify the system design in comparison with a case in which the start times of the synchronization frame reception-enabled time period and the synchronization frame reception-enabled time period durations in the time slave stations TS1 and TS2 are individually set.

(2) Synchronization Error Detecting Process

Figure 10:
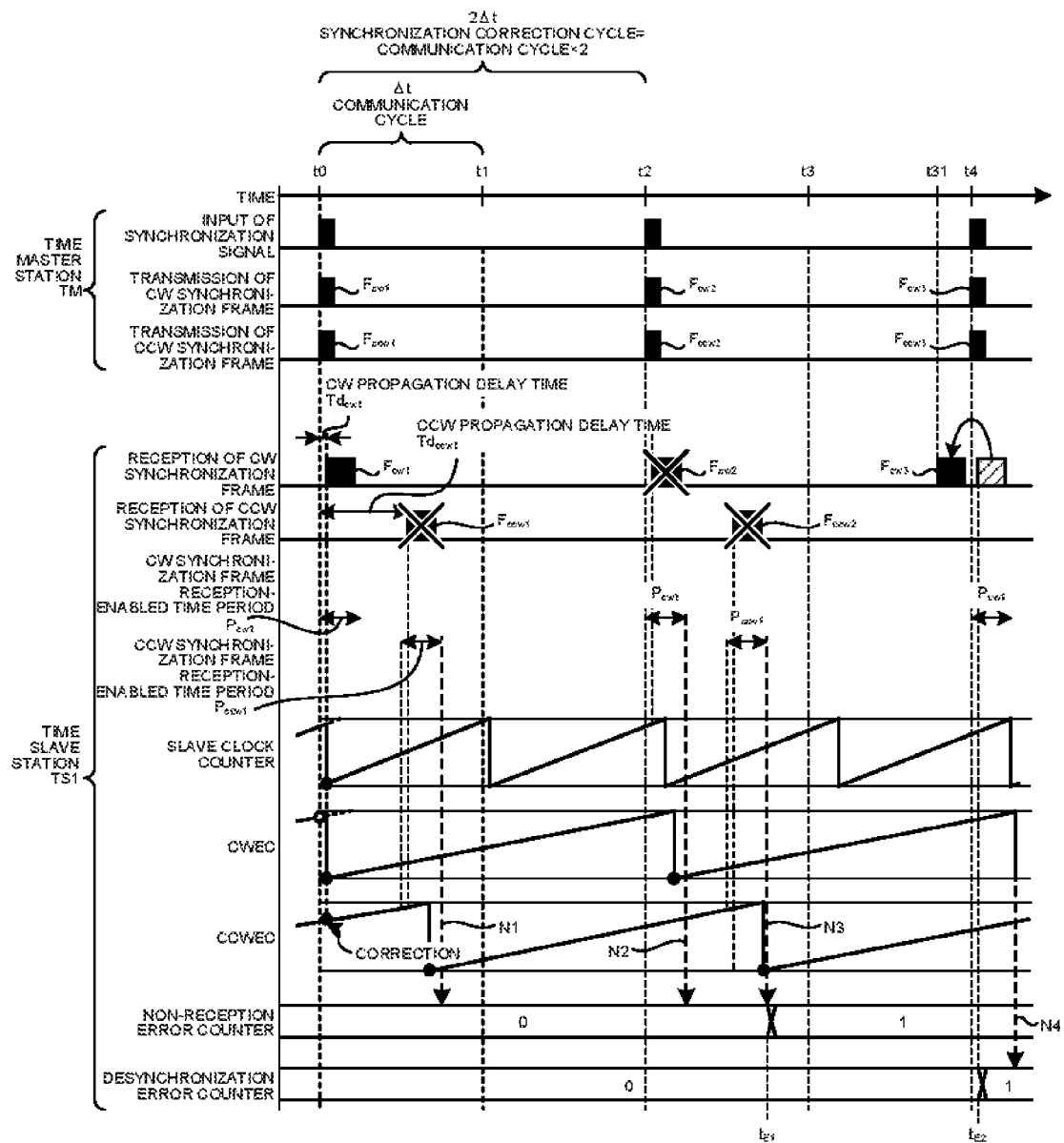
FIG. 10 is a diagram illustrating a concept of a synchronization error detecting process according to the embodiment.

FIG. 10 is a diagram illustrating a concept of a synchronization error detecting process according to the embodiment. In the drawing, the horizontal axis represents time. Here, the operations of the time master station TM and the time slave station TS1 are illustrated, the operations of which are the same as those of the other time slave stations TS.

First, in the time master station TM, when a synchronization signal is input from the synchronization master at time to, a CW synchronization frame $F_{CW1}$ is transmitted from the CW-based transmission unit and a CCW synchronization frame $F_{CCW1}$ is transmitted from the CCW-based transmission unit. This process is performed in a predetermined period in consideration of synchronization jitter from time t0.

In contrast, in the time slave station TS1, when the CWEC becomes equal to or greater than the start time of the synchronization frame reception-enabled time period (the first set value), the counting of the CW synchronization frame reception-enabled time period $P_{CW1}$ is performed by the CW synchronization-enabled time period timer 363. When the CW synchronization frame is received after the CW propagation delay time $Td_{CW1}$ elapses from time t0 in the CW synchronization frame reception-enabled time period $P_{CW1}$, the slave clock counter and the CWEC are reset and the CCWEC is corrected to a predetermined correction value (the fourth set value).

Thereafter, in the time slave station TS1, when the CCWEC becomes equal to or greater than the start time of the synchronization frame reception-enabled time period (the second set value), the counting of the CCW synchronization frame reception-enabled time period $P_{CCW1}$ is performed by the CCW synchronization-enabled time period timer 364. However, in the CCW-based communication path, it is assumed that the CCW synchronization frame $F_{CCW1}$ is lost by noise. That is, the time slave station TS1 does not receive the CCW synchronization frame $F_{CCW1}$ in the CCW synchronization frame reception-enabled time period $P_{CCW1}$.

Thereafter, when the CCWEC reaches the cycle value of the CCW synchronization frame reception-enabled time period, the CCW-based synchronization error determining unit 366 transmits a notification of error occurrence N1 to the non-reception error counter unit 367. Here, since it is assumed that the CCW synchronization frame $F_{CCW1}$ is lost by noise and the CCW synchronization frame $F_{CCW1}$ is not received outside the synchronization frame reception-enabled time period $P_{CCW1}$, the CCW-based synchronization error determining unit 366 does not transmit a notification of error occurrence to the desynchronization error counter unit 368.

Since the notification of error occurrence N1 is received from only the CCW-based synchronization error determining unit 366, the non-reception error counter unit 367 does not cause the non-reception error counter to increment. Since an increment condition is not satisfied, the desynchronization error counter unit 368 does not cause the desynchronization error counter to increment.

Thereafter, in the time slave station TS1, when the CWEC reaches the start time of the synchronization frame reception-enabled time period (the first set value), the counting of the CW synchronization frame reception-enabled time period $P_{CW1}$ is performed by the CW synchronization-enabled time period timer 363. However, it is assumed that the CW synchronization frame $F_{CW2}$ transmitted from the time master station TM is lost by noise. That is, CW synchronization frame $F_{CW2}$ is not received in the CW synchronization frame reception-enabled time period $P_{CW1}$ after the CW propagation delay time $Td_{CCW1}$ elapses from time t2.

Thereafter, when the CWEC reaches the cycle value of the CW synchronization frame reception-enabled time period, the CW-based synchronization error determining unit 365 transmits a notification of error occurrence N2 to the non-reception error counter unit 367. Here, since it is assumed that the CCW synchronization frame $F_{CCW1}$ is lost by noise and the CCW synchronization frame $F_{CCW1}$ is not received outside the synchronization frame reception-enabled time period $P_{CW1}$, the CW-based synchronization error determining unit 365 does not transmit a notification of error occurrence to the desynchronization error counter unit 368.

Then, when the CCWEC reaches the start time of the synchronization frame reception-enabled time period (the second set value), the counting of the CCW synchronization frame reception-enabled time period $P_{CCW1}$ is performed by the CCW synchronization-enabled time period timer 364. Here, in the CCW-based communication path, it is assumed that the CCW synchronization frame $F_{CCW2}$ is lost by noise, which is described above and thus will not be repeated. As a result, the CCW-based synchronization error determining unit 366 transmits a notification of error occurrence N3 to the non-reception error counter unit 367.

Thereafter, at the end timing $t_{E1}$ of the CCW synchronization frame reception-enabled time period $P_{CCW1}$, the non-reception error counter unit 367 receives the notifications of non-reception errors N2 and N3 from the CW-based synchronization error determining unit 365 and the CCW-based synchronization error determining unit 366 in a single synchronization correction cycle and thus the non-reception error counter increments.

Thereafter, at time t31 that is earlier than time t4, it is assumed that the CW synchronization frame $F_{CW3}$ is received by the time slave station TS1 along the CW-based communication path. Here, it is assumed that time t31 is not in the CW synchronization frame reception-enabled time period $P_{CW1}$. Accordingly, the CW-based synchronization error determining unit 365 transmits a notification of a desynchronization error N4 to the desynchronization error counter unit 368 at time $t_{E2}$ at which the CWEC is reset. The desynchronization error counter unit 368 causes the desynchronization error counter to increment.

In this way, the non-reception error and the desynchronization error are counted. When the error count value of the non-reception error counter unit 367 or the error count value of the desynchronization error counter unit 368 reaches a predetermined value, a notification of error occurrence is transmitted to an application of the synchronization system. The error count value of the non-reception error counter unit 367, with which the notification of error occurrence is transmitted to the application, can be set to a fixed value in all the time slave stations TS constituting the ring-shaped synchronous network system; and the error count value of the desynchronization error counter unit 368, with which the notification of error occurrence is transmitted to the application, can be set to a fixed value in all the time slave stations TS constituting the ring-shaped synchronous network system. Accordingly, it is possible to simplify maintenance of the ring-shaped synchronous network system.

Figure 11:
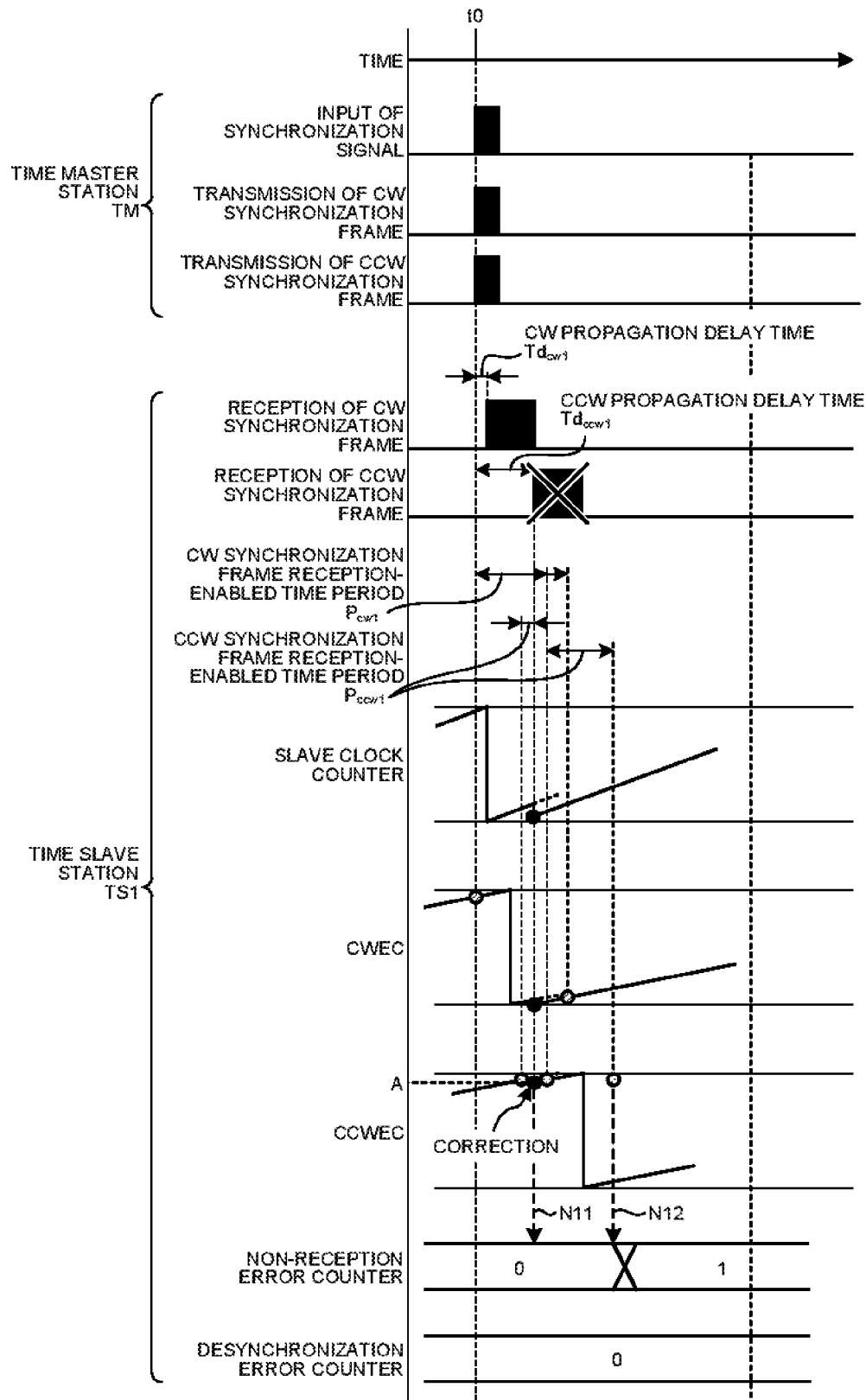
FIG. 11 is a diagram illustrating a concept of a process of erroneously detecting a non-reception error when a synchronization-enabled time period timer is not mounted.

The reason for mounting the CW synchronization-enabled time period timer separately from the CWEC in order to manage the end of the CW synchronization frame reception-enabled time period and the reason for mounting the CCW synchronization-enabled time period timer separately from the CCWEC in order to manage the end of the CCW synchronization frame reception-enabled time period will be described below. FIG. 11 is a diagram illustrating a concept of a process of erroneously detecting a non-reception error when the synchronization-enabled time period timer is not mounted.

In this example, the start and end of the CW synchronization frame reception-enabled time period are managed by the CWEC, and the start and end of the CCW synchronization frame reception-enabled time period are managed by the CCWEC. Specifically, the CW synchronization frame reception-enabled time period is set to start when the CWEC becomes equal to or greater than the start threshold for the synchronization frame reception-enabled time period; and the CW synchronization frame reception-enabled time period is set to end when the CWEC becomes equal to or greater than the end threshold for the synchronization frame reception-enabled time period and becomes less than the start threshold for the synchronization frame reception-enabled time period. The CCW synchronization frame reception-enabled time period is set to start when the CCWEC becomes equal to or greater than the start threshold for the synchronization frame reception-enabled time period; and the CCW synchronization frame reception-enabled time period is set to end when the CCWEC becomes equal to or greater than the end threshold for the synchronization frame reception-enabled time period and becomes less than the start threshold for the synchronization frame reception-enabled time period.

Here, it is assumed that the synchronization frame is received through only the CW-based communication path. That is, in the CCW-based communication path, it is assumed that the CCW synchronization frame is lost by noise or that the CCW synchronization frame is not transmitted in the exclusive type ring-shaped synchronous network system.

When the count value of the CCWEC reaches a predetermined value A at which the CCW synchronization frame reception-enabled time period starts, the CCW synchronization frame reception-enabled time period $P_{CCW1}$ starts. Thereafter, when the count value of the CCWEC is corrected to be less than the predetermined value A by the reception of the CW synchronization frame, the CCW synchronization frame reception-enabled time period ends at that time. Thereafter, when the count value of the CCWEC reaches the predetermined value A again, the CCW synchronization frame reception-enabled time period $P_{CCW1}$ starts. Then, when a predetermined count value is reached, the CCW synchronization frame reception-enabled time period $P_{CCW1}$ ends.

As described above, the CCW synchronization frame does not flow in the CCW-based communication path. Accordingly, since the CCW synchronization frame is not received during the CCW synchronization frame reception-enabled time periods $P_{CCW1}$, notifications of a non-reception error N11 and N12 are transmitted at the time of the ends of the CCW synchronization frame reception-enabled time periods $P_{CCW1}$. As a result, the non-reception error counter unit 367 receives two notifications of a non-reception error N11 and N12 in the same synchronization period, the non-reception error counter is incremented, and the non-reception error is erroneously detected.

In this way, since the plural synchronization frame reception-enabled time periods are generated in a short period and the synchronization frame is not received during the synchronization frame reception-enabled time periods, a non-reception error is erroneously detected as a result. Accordingly, as in the above-mentioned embodiment, by disposing the CW synchronization-enabled time period timer 363 to manage the end of the CW synchronization frame reception-enabled time period and disposing the CCW synchronization-enabled time period timer 364 to manage the end of the CCW synchronization frame reception-enabled time period, it is possible to avoid erroneous detection of a non-reception error. In a simultaneous reception type ring-shaped synchronous network system, since the synchronization frame is received from both the CW system and CCW system, the timing of detecting a non-reception error is set to the end timing of the synchronization-enabled time period of the path having a larger propagation delay time of a synchronization frame.

According to this embodiment, in the ring-shaped synchronous network system in which the respective stations in the network transmit a frame one single time per communication cycle, the communication cycle duration is set to 1/N (where N is an arbitrary natural number) of the synchronization correction cycle duration. Accordingly, even when a slave station not associated with synchronization control is present in the network, it is possible to prevent the communication cycle duration from being dragged to the synchronization correction cycle duration and from being extended. As a result, it is possible to shorten an interval for updating data in the network, and to enhance a utilization rate of a communication line.

All the time slave stations TS include the CWEC, the CW synchronization-enabled time period timer 363, the CCWEC, and the CCW synchronization-enabled time period timer 364; and the start time of the synchronization frame reception-enabled time period and the duration of the synchronization frame reception-enabled time period are set to the fixed values. Accordingly, it is not necessary to set the start time and the duration of the synchronization frame reception-enabled time period for each time slave station TS and it is thus possible to simplify design of the synchronization system.

Since the desynchronization error counter unit 368 and the non-reception error counter unit 367 are provided, it is detected that the time master station TM and the time slave station TS are not synchronized, and a notification of an error is transmitted to an application of the synchronization system. Therefore, it is possible to improve reliability of the synchronization system.

As described above, by connecting the time master station TM and the time slave stations TS via transmission paths to form a dual ring and synchronizing the CW-based communication path TL1 and the CCW-based communication path TL2 with each other, it is possible to construct a synchronous network system with high reliability (synchronized operation continuity). For example, even when a time slave station TS is out of order or disconnection of a transmission path occurs, the time master station TM or the time slave station TS in the system can receive a frame and can continuously perform synchronized operations by coping with both the clockwise direction and the counterclockwise direction. As a result, even when a part of the network is not used for communication, it is possible to continuously perform, for example, operations of production lines of a factory.

In order to cope with discrete-cycle synchronization, the CWEC and the CCWEC are provided as a synchronization-enabled time period counter separately from the slave clock counter. In an exclusive type ring-shaped synchronous network system, as described above, a synchronization frame is received through only one of the CW system and the CCW system for a long period time. Accordingly, by setting the CWEC to a predetermined correction value when a CCW synchronization frame is received in a CCW synchronization-enabled period, for example, in a state in which only the CCW synchronization frame is transmitted, it is possible to correctly transmit a notification of a start time of a CW-based synchronization-based period using the CWEC even when the CW synchronization frame is not received for a long period time.

INDUSTRIAL APPLICABILITY

As described above, the ring-shaped synchronous network system according to the present invention can be usefully used for a ring-shaped synchronous network system in which a communication cycle duration is 1/N times a synchronization correction cycle duration.

REFERENCE SIGNS LIST

11 TIME MASTER CLOCK
12 SYNCHRONIZATION SIGNAL INPUT UNIT
13 SYNCHRONIZATION ERROR DETECTING UNIT
14 MASTER CLOCK COUNTER CORRECTING UNIT
15, 32 CW-BASED TRANSMISSION UNIT
16, 33 CW-BASED RECEPTION UNIT
17, 34 CCW-BASED TRANSMISSION UNIT
18, 35 CCW-BASED RECEPTION UNIT
31 TIME SLAVE CLOCK
36 SYNCHRONIZATION ERROR DETECTING UNIT
37 SLAVE CLOCK COUNTER CORRECTING UNIT
38 SYNCHRONIZATION SIGNAL OUTPUT UNIT
361 CWEC CORRECTING UNIT
362 CCWEC CORRECTING UNIT
363 CW SYNCHRONIZATION-ENABLED TIME PERIOD TIMER
364 CCW SYNCHRONIZATION-ENABLED TIME PERIOD TIMER
365 CW-BASED SYNCHRONIZATION ERROR DETERMINING UNIT
366 CCW-BASED SYNCHRONIZATION ERROR DETERMINING UNIT
367 NON-RECEPTION ERROR COUNTER UNIT
368 DESYNCHRONIZATION ERROR COUNTER UNIT
TM TIME MASTER STATION
TS, TS1 TO TS3 TIME SLAVE STATION

The invention claimed is:

1. A time slave station that is used in a ring-shaped synchronous network system
   to which a time master station and one or more time slave stations are connected so as to form a dual ring configuration via transmission paths and
   in which a synchronization correction cycle between the time master station and the time slave station is a natural number times a communication cycle with which the time master station and the time slave station periodically communicate with each other, the time slave station comprising:
   a processor comprising:
      a slave clock counter that counts the communication cycles; and
      a synchronization error detector that detects a synchronization error between the time master station and the time slave station, wherein
      the synchronization error detector includes:
         a first synchronization error detecting counter that counts the synchronization correction cycles of the transmission path in which a frame is transmitted in a first direction;
         a second synchronization error detecting counter that counts the synchronization correction cycles of the transmission path in which a frame is transmitted in a second direction that is opposite to the first direction;
         a first synchronization-enabled time period counter that counts a first synchronization frame reception-enabled time period that is a reception-enabled time period of a first synchronization frame transmitted in the first direction when a count value of the first synchronization error detecting counter reaches a first set value;
         a second synchronization-enabled time period counter that counts a second synchronization frame reception-enabled time period that is a reception-enabled time period of a second synchronization frame transmitted in the second direction when a count value of the second synchronization error detecting counter reaches a second set value;
         a first synchronization error determiner that determines whether the first synchronization frame is received during the first synchronization frame reception-enabled time period; and
         a second synchronization error determiner that determines whether the second synchronization frame is received during the second synchronization frame reception-enabled time period.

2. The time slave station according to claim 1, wherein the processor further comprises a slave clock counter corrector that corrects the slave clock counter, wherein the synchronization error detector further includes:
  a first synchronization error detecting counter corrector that corrects the first synchronization error detecting counter; and
  a second synchronization error detecting counter corrector that corrects the second synchronization error detecting counter, wherein
the slave clock counter corrector, the first synchronization error detecting counter corrector, and the second synchronization error detecting counter corrector respectively correct the slave clock counter, the first synchronization error detecting counter, and the second synchronization error detecting counter in response to a notification of a correction timing from the first synchronization error determiner or the second synchronization error determiner.

3. The time slave station according to claim 2, wherein the first synchronization error detecting counter corrector,
  when the notification of a correction timing is received from the first synchronization error determiner or when the synchronization correction cycle is counted, resets the first synchronization error detecting counter, and
  when the notification of a correction timing is received from the second synchronization error determiner, sets the count value of the first synchronization error detecting counter to a third set value, and
the second synchronization error detecting counter corrector,
  when the notification of a correction timing is received from the second synchronization error determiner or when the synchronization correction cycle is counted, resets the second synchronization error detecting counter, and
  when the notification of a correction timing is received from the first synchronization error determiner, sets the count value of the second synchronization error detecting counter to a fourth set value.

4. The time slave station according to claim 1, wherein the first set value, the second set value, the first synchronization frame reception-enabled time period, and the second synchronization frame reception-enabled time period are equal in all the time slave stations constituting the ring-shaped synchronous network system.

5. The time slave station according to claim 1, wherein the synchronization error detector further includes a non-reception error counter that counts a non-reception error when both a notification of a non-reception error of the first synchronization frame during the first synchronization frame reception-enabled time period and a notification of a non-reception error of the second synchronization frame during the second synchronization frame reception-enabled time period are received,
the first synchronization error determiner transmits the notification of a non-reception error to the non-reception error counter when the first synchronization frame is not received during the first synchronization frame reception-enabled time period,
the second synchronization error determiner transmits the notification of a non-reception error to the non-reception error counter when the second synchronization frame is not received during the second synchronization frame reception-enabled time period, and
the non-reception error counter transmits a notification of error occurrence when the number of non-reception errors reaches a fifth set value.

6. The time slave station according to claim 1, wherein the synchronization error detector further includes a desynchronization error counter that counts a desynchronization error when a notification of a desynchronization error is received by reception of the first synchronization frame outside the first synchronization frame reception-enabled time period or a notification of a desynchronization error is received by reception of the second synchronization frame outside the second synchronization frame reception-enabled time period,
the first synchronization error determiner transmits the notification of a desynchronization error to the desynchronization error counter when the first synchronization frame is received outside the first synchronization frame reception-enabled time period,
the second synchronization error determiner transmits the notification of a desynchronization error to the desynchronization error counter when the second synchronization frame is received outside the second synchronization frame reception-enabled time period, and
the desynchronization error counter transmits a notification of error occurrence when the number of desynchronization errors reaches a sixth set value.

7. The time slave station according to claim 1, wherein the ring-shaped synchronous network system is an exclusive type ring-shaped synchronous network system that exclusively receives the first synchronization frame and the second synchronization frame or a simultaneous type ring-shaped synchronous network system that simultaneously receives the first synchronization frame and the second synchronization frame.

8. The time slave station according to claim 2, wherein the slave clock counter corrector corrects the slave clock counter in response to the synchronization frame received later among the first synchronization frame and the second synchronization frame.

9. The time slave station according to claim 1, wherein the processor further comprises a synchronization frame reception-enabled time period setter that sets the first synchronization frame reception-enabled time period and the second synchronization frame reception-enabled time period for all the time slave stations constituting the ring-shaped synchronous network system.

10. The time slave station according to claim 1, wherein the processor further comprises:
  a communication cycle duration setter that sets the communication cycle; and
  a synchronization correction cycle setter that sets the synchronization correction cycle.

11. A ring-shaped synchronous network system
to which a time master station and one or more time slave stations are connected so as to form a dual ring configuration via transmission paths and
in which a synchronization correction cycle between the time master station and the time slave station is a natural number times a communication cycle with which the time master station and the time slave station periodically communicate with each other, wherein
the time master station includes:
  a synchronization signal inputter that receives an input of a synchronization signal from an external device;
  a first synchronization frame transmitter that, when the synchronization signal is received, transmits a first synchronization frame, which is transmitted in a first direction along the transmission path, with the synchronization correction cycle; and a second synchronization frame transmitter that, when the synchronization signal is received, transmits a second synchronization frame, which is transmitted in a second direction opposite to the first direction along the transmission path, with the synchronization correction cycle, the time slave station includes:
a first frame receiver that receives a frame from the transmission path in which the frame is transmitted in the first direction;
a second frame receiver that receives a frame from the transmission path in which the frame is transmitted in the second direction; and
a processor comprising:
a slave clock counter that counts the communication cycles; and
a synchronization error detector that detects a synchronization error between the time master station and the time slave station,
the synchronization error detector includes:
a first synchronization error detecting counter that counts the synchronization correction cycles of the transmission path in which a frame is transmitted in the first direction;
a second synchronization error detecting counter that counts the synchronization correction cycles of the transmission path in which a frame is transmitted in the second direction;
a first synchronization-enabled time period counter that counts a first synchronization frame reception-enabled time period which is a reception-enabled time period of the first synchronization frame when a count value of the first synchronization error detecting counter reaches a first set value;
a second synchronization-enabled time period counter that, when a count value of the second synchronization error detecting counter reaches a second set value, counts a second synchronization frame reception-enabled time period that is a reception-enabled time period of the second synchronization frame;
a first synchronization error determiner that determines whether the first synchronization frame is received during the first synchronization frame reception-enabled time period by the first frame receiver; and
a second synchronization error determiner that determines whether the second synchronization frame is received during the second synchronization frame reception-enabled time period by the second frame receiver.

12. The ring-shaped synchronous network system according to claim 11, wherein
the time master station further includes
a processor comprising a synchronization frame reception-enabled time period setter that sets the first synchronization frame reception-enabled time period and the second synchronization frame reception-enabled time period for all the time slave stations constituting the ring-shaped synchronous network system.

13. The ring-shaped synchronous network system according to claim 11, wherein
the processor of the time master station further includes:
a communication cycle duration setter that sets the communication cycle; and
a synchronization correction cycle setter that sets the synchronization correction cycle.

14. The ring-shaped synchronous network system according to claim 11, wherein
in the time slave station, the synchronization error detector further includes a non-reception error counter that counts a non-reception error when both a notification of a non-reception error of the first synchronization frame during the first synchronization frame reception-enabled time period and a notification of a non-reception error of the second synchronization frame during the second synchronization frame reception-enabled time period are received,
the first synchronization error determiner transmits the notification of a non-reception error to the non-reception error counter when the first synchronization frame is not received during the first synchronization frame reception-enabled time period,
the second synchronization error determiner transmits the notification of a non-reception error to the non-reception error counter when the second synchronization frame is not received during the second synchronization frame reception-enabled time period, and
the non-reception error counter transmits a notification of error occurrence when the number of non-reception errors reaches a fifth set value.

15. The ring-shaped synchronous network system according to claim 11, wherein
in the time slave station, the synchronization error detector further includes a desynchronization error counter that counts a desynchronization error when a notification of a desynchronization error is received by reception of the first synchronization frame outside the first synchronization frame reception-enabled time period or a notification of a desynchronization error is received by reception of the second synchronization frame outside the second synchronization frame reception-enabled time period,
the first synchronization error determiner transmits the notification of a desynchronization error to the desynchronization error counter when the first synchronization frame is received outside the first synchronization frame reception-enabled time period,
the second synchronization error determiner transmits the notification of a desynchronization error to the desynchronization error counter when the second synchronization frame is received outside the second synchronization frame reception-enabled time period, and
the desynchronization error counter transmits a notification of error occurrence when the number of desynchronization errors reaches a sixth set value.

* * * * *